(12) United States Patent
Garis (10) Patent No.: US 6,467,759 B2
(45) Date of Patent: Oct. 22, 2002

(54) CONTROLLABLE EQUIPMENT MOUNT

(75) Inventor: Chester A. Garis, Gloucester, VA (US)

(73) Assignee: Newport News Shipbuilding, Inc., Newport News, VA (US)

( * ) Notice: Subject to any disclaimer, the term of this patent is extended or adjusted under 35 U.S.C. 154(b) by 0 days.

(21) Appl. No.: 09/785,401

(22) Filed: Feb. 20, 2001

(65) Prior Publication Data

US 2002/0113350 A1 Aug. 22, 2002

(51) Int. Cl.[7] .................................................. F16F 9/04
(52) U.S. Cl. .................................................. 267/64.27
(58) Field of Search ................................ 267/134, 136, 267/140.12, 140.5, 201, 205, 64.11, 64.19, 64.21, 64.23, 64.24, 64.27; 248/580–582, 610, 613, 632, 634, 635, 638

(56) References Cited

U.S. PATENT DOCUMENTS

| | | | | |
|---|---|---|---|---|
| 5,062,497 A | * | 11/1991 | Ogata | 180/300 |
| 5,170,997 A | * | 12/1992 | Girard et al. | 180/312 |
| 5,429,338 A | | 7/1995 | Runge et al. | |
| 5,615,868 A | * | 4/1997 | Murray | 248/638 |

* cited by examiner

Primary Examiner—Christopher P. Schwartz
Assistant Examiner—C. T. Bartz
(74) Attorney, Agent, or Firm—Hunton & Williams (57) ABSTRACT

A controllable equipment mount is provided that is adjustable to accommodate various loads. The controllable equipment mount comprises a base, a load plate and a connecting mount connecting the base and the load plate. An internal chamber is created which can be used to adjust stiffness of the mount by adjusting pressure within the chamber, e.g., by introducing a gas through an air passageway. An electromagnetic augmentation unit may also be provided in the chamber for adjusting the stiffness within the chamber.

22 Claims, 10 Drawing Sheets

CONTROLLABLE EQUIPMENT MOUNT

FIELD OF THE INVENTION

The invention relates to vibration absorption and in particular to a controllable equipment mount (also referred to herein as a "controllable mount" or a "mount") for isolating equipment from shock loads and small amplitude acoustic vibrations.

BACKGROUND OF THE INVENTION

To minimize transmission of small amplitude vibrations into surrounding water, shipboard equipment and/or equipment platforms are often mounted on resilient mounts. The standard resilient mount stiffness must be sufficiently low to ensure adequate attenuation of input excitations. However, a mount with a sufficiently low stiffness to handle such excitations is not stiff enough to compensate for shock loads such as those experienced during battle conditions. Thus equipment mounted with a standard resilient mount would experience large deflections when subjected to shock loads. Accordingly, a mount is needed that attenuates vibrations for a wide range of loads.

Runge, U.S. Pat. No. 5,429,338, hereby incorporated by reference in a manner consistent with this invention and application, provides one solution to the problem of dealing with load variation. This patent discloses an equipment mount having three components, including a base mounted to a foundation, a retainer on which the equipment is mounted, and a resilient member disposed between the base and the retainer. The resilient member and the retainer are shaped to provide shock isolation over a large displacement range.

While the equipment mount of Runge provides significant improvements over previously known mounts, the range of stiffness is still somewhat limited so that different mounts may be necessary for different applications. Furthermore, the mount of Runge may be insufficient for supporting very large loads, or its footprint may have to be increased to support very large loads. Accordingly, a mount is needed that can adjust to a wider range of load variations to accommodate a wide variety of mount requirements. Furthermore, a need exists for supporting larger loads while maintaining a small footprint.

SUMMARY OF THE INVENTION

It is accordingly an object of the invention to provide a controllable mount having a variable internal pressure and volume.

A further object of the invention is to provide a mount that is tunable to a plurality of differing load conditions.

To achieve the foregoing objects, and in accordance with the purposes of the invention as embodied and broadly described herein, there is provided a controllable equipment mount for substantially isolating equipment from shock loads and acoustic vibrations. The controllable equipment mount comprises a base (or a "base plate") for securing the controllable equipment mount to a foundation and a load plate positioned substantially parallel, and preferably parallel, to the base. The load plate is adapted for mounting equipment on it. The controllable equipment mount further comprises a C-mount section (or a "connecting mount") for connecting the load plate and the base, the C-mount section being secured to both the load plate and the base. The C-mount section is sealed between the base and the load plate by any suitable means, e.g., with O-rings, and is held in place by fasteners attaching it to the base and load plate. Thus, the C-mount section forms a closed chamber between the base and the load plate. A passageway is positioned in a wall of the chamber, for providing communication between the chamber and area outside the chamber. The passageway may be used to inject gas into the chamber to vary pressure in the chamber, thereby adjusting stiffness of the controllable equipment mount. In one embodiment, the passageway is provided in the load plate, e.g., an upper surface of the load plate.

In another aspect of the invention, a controllable equipment mount is provided for substantially isolating equipment from shock loads and acoustic vibrations. The controllable equipment mount comprises a base for securing the mount to a foundation, a load plate positioned substantially parallel, and preferably parallel, to the base, the load plate adapted for mounting the equipment, and a connecting mount for connecting the load plate and the base. The connecting mount is secured to both the load plate and the base and defines a closed chamber between the base and the load plate. The controllable equipment mount further comprises means for adjusting stiffness of the mount to enable the mount to be used with different loads and in a variety of environments. The means for adjusting stiffness of the mount may include a means of varying internal pressure within the chamber.

In yet another aspect of the invention, a controllable equipment mount is provided for substantially isolating equipment from shock loads and acoustic vibrations. The controllable equipment mount comprises a base for securing the mount to a foundation, a load plate positioned substantially parallel, and preferably parallel, to the base, the load plate adapted for mounting the equipment, and a first connecting mount for connecting the load plate and the base, the first connecting mount being secured to both the load plate and the base and defining a first closed chamber between the base and the load plate. The controllable equipment mount further comprises a second connecting mount, within the first connecting mount, the second connecting mount being secured to both the load plate and the base, the second connecting mount defining a second closed chamber between the base and the load plate. The controllable equipment mount further comprises pressure adjustment means for adjusting an internal pressure of at least one of said first and second chambers.

In any embodiment of the invention stiffness of the mount may be adjusted by varying pressure in the chamber of a single chamber mount, or in at least one chamber of a two chamber mount, applying a mechanical force, e.g., by using an electromagnetic augmentation unit (EAU), in the chamber of a single chamber mount or in at least one chamber of a two chamber mount, or by combining the variance of pressure and the application of a mechanical force in the chamber of a single chamber mount or in at least one chamber of the two chamber mount.

The invention is also directed to a method of adjusting stiffness of a controllable equipment mount used to substantially isolate equipment from shock loads and vibrations. The method can be used with any of the controllable equipment mounts of the invention. The method comprises adjusting the stiffness of the equipment mount by varying pressure in one or more chambers of the equipment mount, and/or by applying a mechanical force between the base plate and the load plate.

Pressure is varied by introducing a sufficient amount of gas into the chamber of a single chamber mount or into at least one chamber of a two chamber mount until a desired stiffness is achieved. Of course, if stiffness is excessive, gas can be released from the chamber or chambers. Any suitable gas may be used, such as air, argon, nitrogen, or carbon dioxide.

A mechanical force may be applied by providing an EAU in a single chamber mount or in at least one chamber of a two chamber mount. The EAU comprises an outer magnet assembly, an inner magnet assembly and a coil assembly. Application of electric current to the coil assembly creates a magnetic field in and around the coil assembly. The magnetic field causes a force to be applied to the load plate in a direction opposite to that of the load force, which increases stiffness of the equipment mount. In this manner, the mount is controlled to stiffen only when required for a particular application, thereby enabling the operator to operate the mount in a manner or mode that gives the mount an optimum acoustical attenuation for that particular application.

These and other features, objects, and advantages of the preferred embodiments will become apparent when the detailed description of the preferred embodiments is read in conjunction with the drawings attached hereto.

DETAILED DESCRIPTION OF THE PREFERRED EMBODIMENTS

Reference will now be made in detail to the present preferred embodiments of the invention, examples of which are illustrated in the accompanying drawings in which like reference numerals refer to corresponding elements.

The term "substantially parallel", as used herein to designate placement of a load plate relative to the base or base plate, means that the load plate may be placed at a plane somewhat varying from parallel relative to the base or base plate, e.g., ±about ½ to about 4° from the parallel plane.

Figure 1:
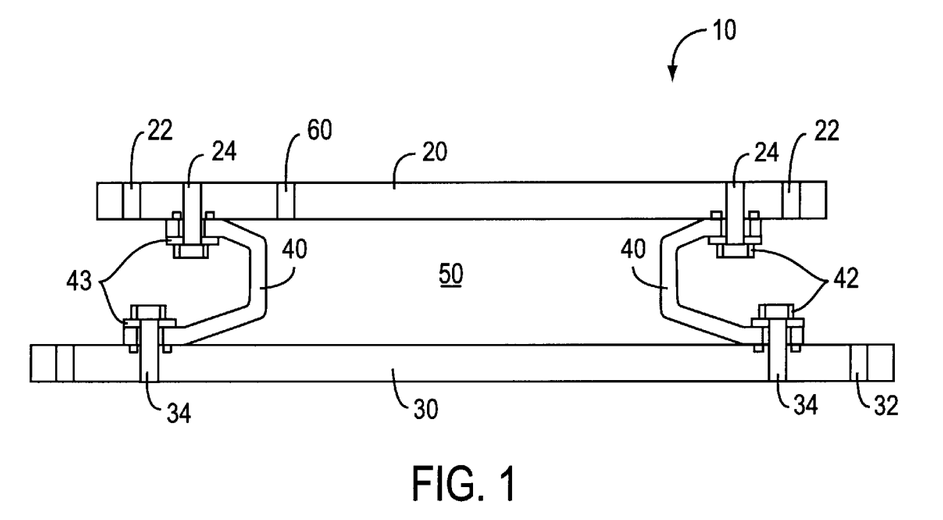
FIG. 1 is a sectional view of a controllable equipment mount of a first embodiment of the invention.

FIG. 1 is a sectional view showing a first embodiment of a controllable equipment mount 10. The controllable equipment mount 10 comprises three connected components including a load plate 20, a base plate 30, and a C-mount section (or connecting mount) 40 connecting the base plate 30 with the load plate 20.

Figure 2:
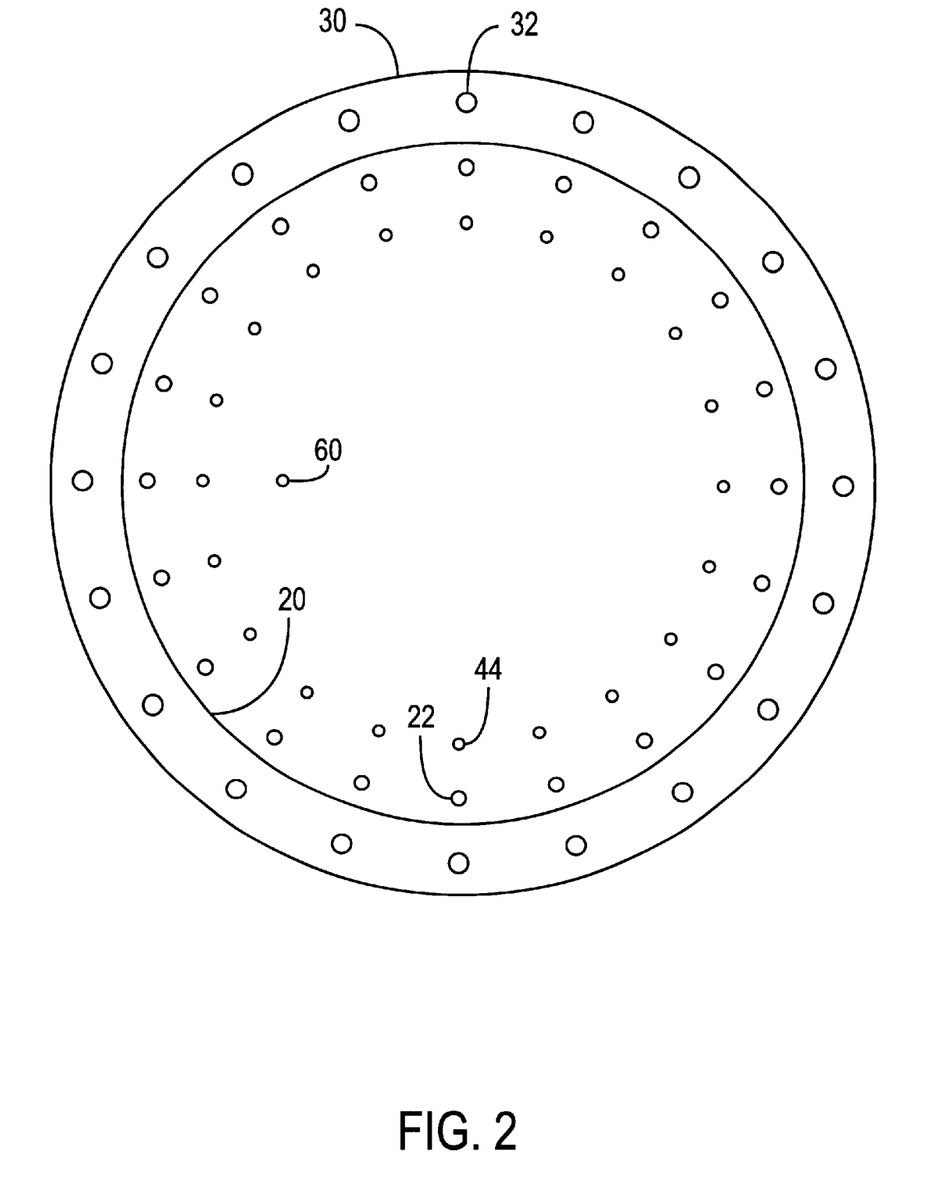
FIG. 2 is a top view of the embodiment shown in FIG. 1.

As is more clearly shown in FIG. 2, the load plate 20 is preferably circular. The load plate 20 includes mounting holes 22 for securing a load to the equipment mount 10. Mounting holes 22 are preferably located near the periphery of load plate 20. Holes 44 are provided for securing the load plate 20 to the connecting mount 40.

The C-mount section 40 joins load plate 20 to base plate 30. The C-mount section 40 is preferably secured to the plates through the use of fasteners, such as bolts 42 and bolting rings 43. As shown in FIG. 1, the bolts extend through mounting holes 24 in the load plate 20 and similarly disposed holes 34 in base plate 30. The C-mount section 40 is sealed by any suitable means, such as O-rings (not shown) between the base plate and the load plate, thereby forming a closed chamber 50.

The base plate 30 further includes mounting holes 32 as shown in FIGS. 1 and 2, which facilitate connection of the base plate 30 to a foundation. The base plate is preferably circular in shape, preferably it has a larger diameter than the load plate 20, and the mounting holes 32 are disposed around a periphery of the base plate 30.

The equipment mount 10 is controllable because the conditions within the closed chamber 50 can be adjusted via a passageway (or "gas passageway") 60 extending through the load plate 20. The gas passageway allows access to the sealed inner volume of the chamber 30 of the controllable mount to apply internal pressure to provide a major lifting force for the mount. The amount of lift to be provided by the internal pressure can be varied to change the stiffness of the mount to meet differing acoustical and lift applications. The amount of lift is varied by varying the internal pressure of the chamber 50. That pressure is varied by introducing a sufficient amount of gas into the chamber 50 through the gas passageway 60 to achieve a desired pressure. Any suitable gas can be used, such as air, argon, nitrogen, or carbon dioxide.

Pressure achieved in the chamber 50 by pumping gas into it may vary, depending on the desired stiffness of the mount. For example, it may range from 5 to 500 psi.

The thickness of the C-mount section material may be varied to provide mounts with alternate acoustic and shock properties. The ability to vary the parameters of the C-mount section material and the internal volume and pressure of the chamber 50 provides flexibility in designing mounts to meet a wide variety of mount requirements. The internal gas volume is varied to obtain different characteristics, which can be further altered or modified as desired, by adding magnetic components or other material, such as a gas (as discussed above). As the volume of gas introduced into the chamber 50 is increased, the internal pressure also increases. When the internal pressure is increased, a given load will be supported at a greater height. This height and pressure variation is reflected as a change in acoustical and shock characteristics of the mount. A mount with a given diameter can be made with different height dimensions, which would give it different damping characteristics at the same load capacity. The flow of gas in an out of the chamber 50 may be controlled in any suitable manner.

Figure 3:
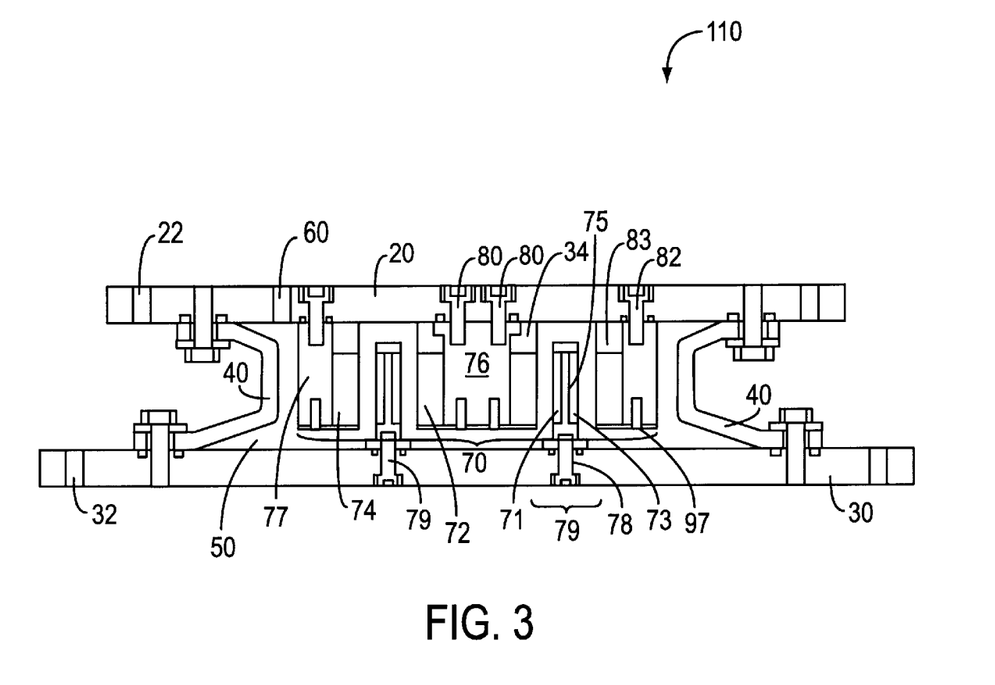
FIG. 3 is a sectional view of a second embodiment of the controllable equipment mount of the invention.
Figure 4:
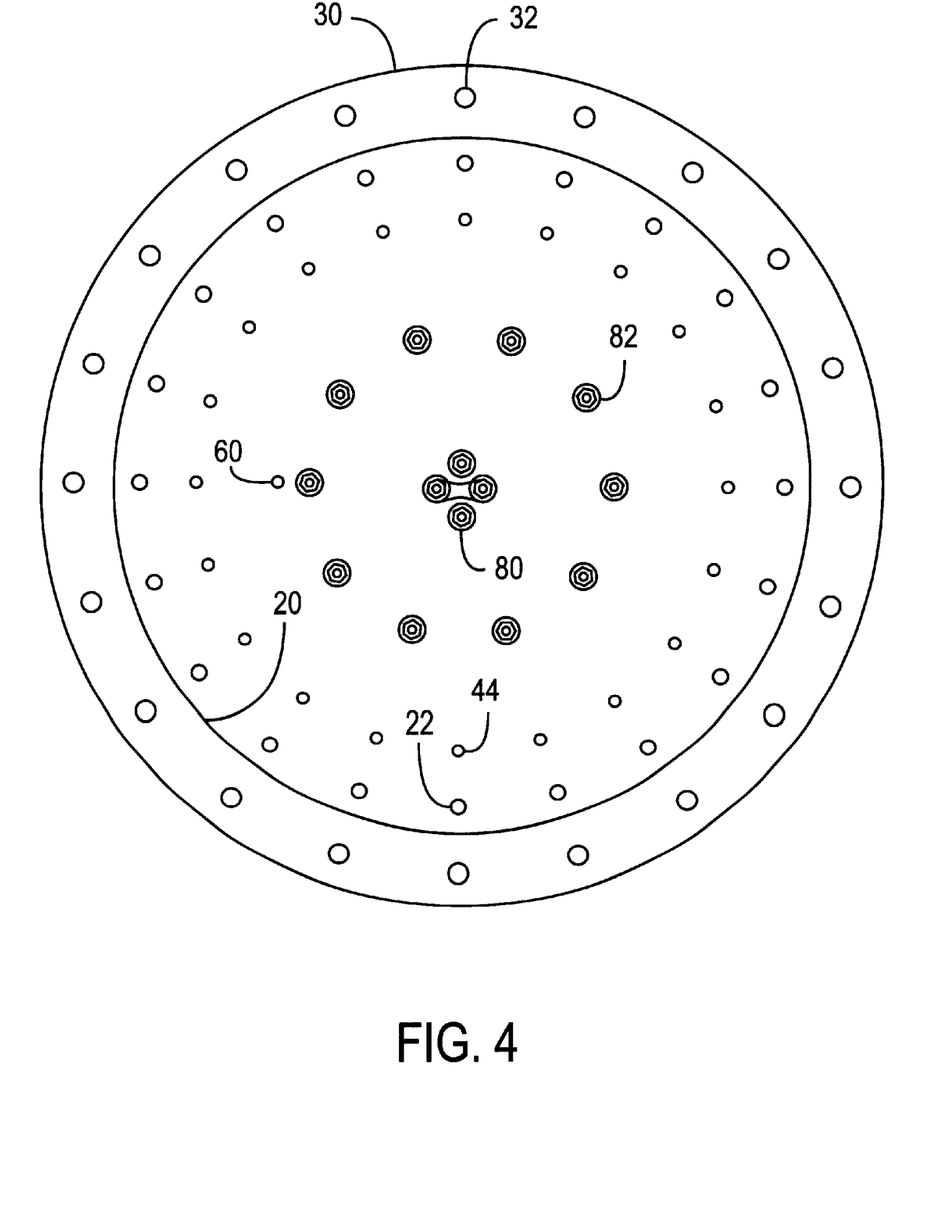
FIG. 4 is a top view of the second embodiment of the equipment mount shown in FIG. 3.
Figure 5:
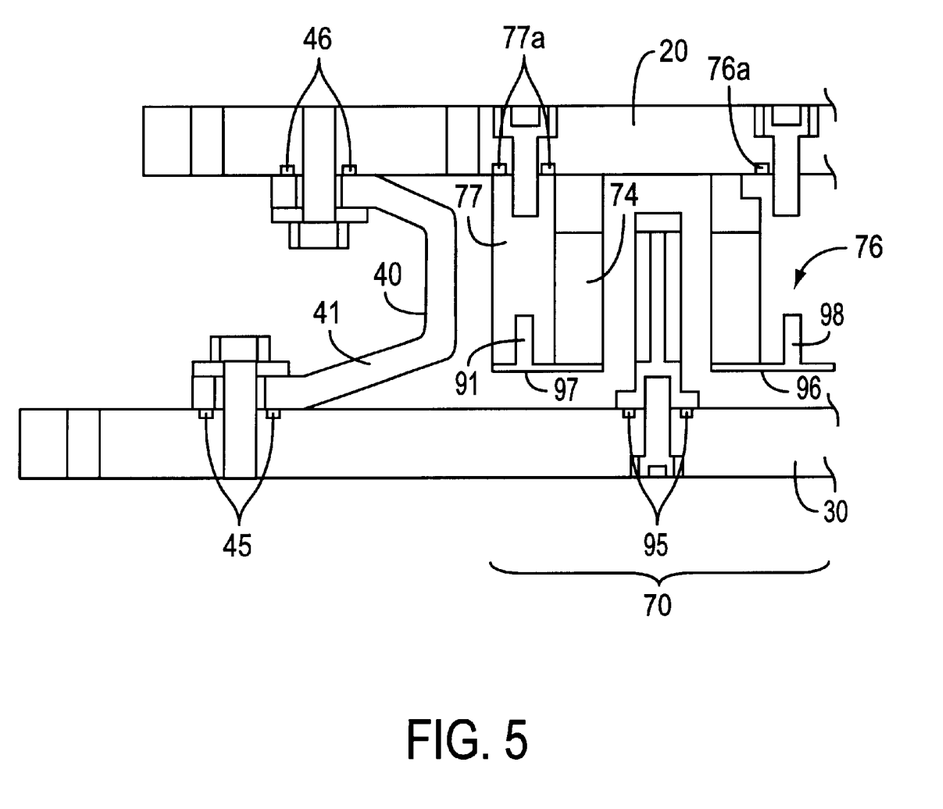
FIG. 5 is a partial sectional view of an electromagnetic augmentation system of the second embodiment shown in FIG. 3.

FIGS. 3–5 show a second embodiment of a controllable equipment mount 110 in which an EAU assemble is provided in the chamber 50. The EAU assembly 70 comprises an outer magnet assembly, an inner magnet assembly and a coil assembly.

The outer magnet assembly includes an outer backiron 77, an outer magnet 74, an outer magnet spacer 83 and an outer backiron retainer plate 97 and fastener(s), such as screws 82.

The inner magnet assembly includes an inner backiron 76, an inner magnet 72, an inner magnet spacer 84 and an inner backiron retainer plate 98 and fastener(s), such as screws 80.

The coil assembly 79 includes a coil backiron 75, an inner coil 71 and an outer coil 73. The inner magnet 72 is separated from the outer magnet 74 by the coil assembly 79. The coil assembly 79 comprises an inner coil 71 and an outer coil 73, separated from each other by a coil backiron 75. The coil assembly 79 is secured to the base plate 30 through the use of a fastener, such as a coil assembly screw 78.

The outer magnet 74 is secured to the load plate 20 by outer magnet fasteners, such as machine screw(s) 82. The outer magnet 74 is spaced from the load plate 20 by the outer magnet spacer 83. The outer backiron 77 is secured to the outer magnet 74 around its periphery.

The inner magnet 72 is secured to the inner backiron 76. The inner backiron 76 is connected by inner magnet fasteners, such as screws 80, to the load plate 20. From the top view shown in FIG. 4, the configuration of the inner and outer magnets 72, 74 can be seen The outer magnet 74 is cylindrical in cross section and the inner magnet 72 is positioned centrally within the outer magnet 74.

The coil assembly 79 is attached to the base plate 30 in the same manner as the inner and outer backirons are attached to the load plate, i.e., by fasteners, such as screws 78.

In operation, the EAU allows conversion of electric current into a mechanical force between the load plate 20 and the base plate 30. When electric current is applied to the coil assembly 79, a magnetic field is created in and around the coil assembly 79. The magnetic field will cause a force to be applied to the load plate 20. The permanent magnets 72, 74 generate a magnetic field through the coil assembly 79. When an electric current is caused to flow through the coils 71 and 73, the current and magnetic field interact via the Lorenz effect and generate mechanical force and movement. The material and size selected for the C-mount section 40 will determine how much resistance the controllable equipment mount 110 will have to movement of the load plate 20. Accordingly, the C-mount section 40 can be designed to accommodate a wide variety of loads. The coil assembly 79 is normally cooled by conduction to the base plate. Alternatively, liquid cooling can be used.

Furthermore, the load plate 20 of the controllable equipment mount of FIGS. 3–5 includes a gas passageway 60 which allows for a gas to be introduced into the chamber 50, as discussed above in connection with the embodiment of FIGS. 1–2. Thus, in the embodiment of FIGS. 3–5, gas injection into the chamber 50 may also be used to provide a major lifting force for the mount. The amount of lift is varied by varying the internal pressure of the chamber 50, as discussed above. Any gas used in the embodiment of FIGS. 1–2 may also be used in the embodiment of FIGS. 3–5. The utilization or the EAU and the ability to vary pressure in the chamber 50 provides the operator of the controllable equipment mount with a greater measure of flexibility in being able to control the stiffness of the mount to meet the requirements of various acoustical and lift applications.

FIG. 5 shows in more detail the seals and retainers of the electromagnetic augmentation system and of the controllable equipment mount 10, generally. C-mount upper seals 46 provide a seal between the C-mount section 40 and the load plate 20. C-mount lower seals 45 provide a seal between C-mount section 40 and base plate 30. Outer backiron seals 77a provide a seal between the outer backiron 77 and the load plate 20. Inner backiron seals 76a provide a seal between the inner backiron 76 and the load plate 20.

Retainer screws 91 are provided to secure an outer magnet retainer plate 97 to the base of the outer backiron 77 and the outer magnet 74. A retainer screw 98 is provided to secure an inner backiron retainer plate 96 to the base of inner backiron 76. Coil backiron seals 95 are provided to seal the interface between coil assembly 79 and the base plate 30.

As in the embodiment of FIGS. 1–2, the base plate 30 and the load plate 20 are circular in shape, and the base plate 30 has a larger diameter than the load plate 20. The base plate 30 has mounting holes 32 and the load plate 20 includes mounting holes 22.

In one aspect of the invention, in the embodiments of FIGS. 1, 2 and FIGS. 3–5, the base plate 30 has diameter of 25.5 inches and the load plate 20 a diameter of 21.5 inches.

Figure 6:
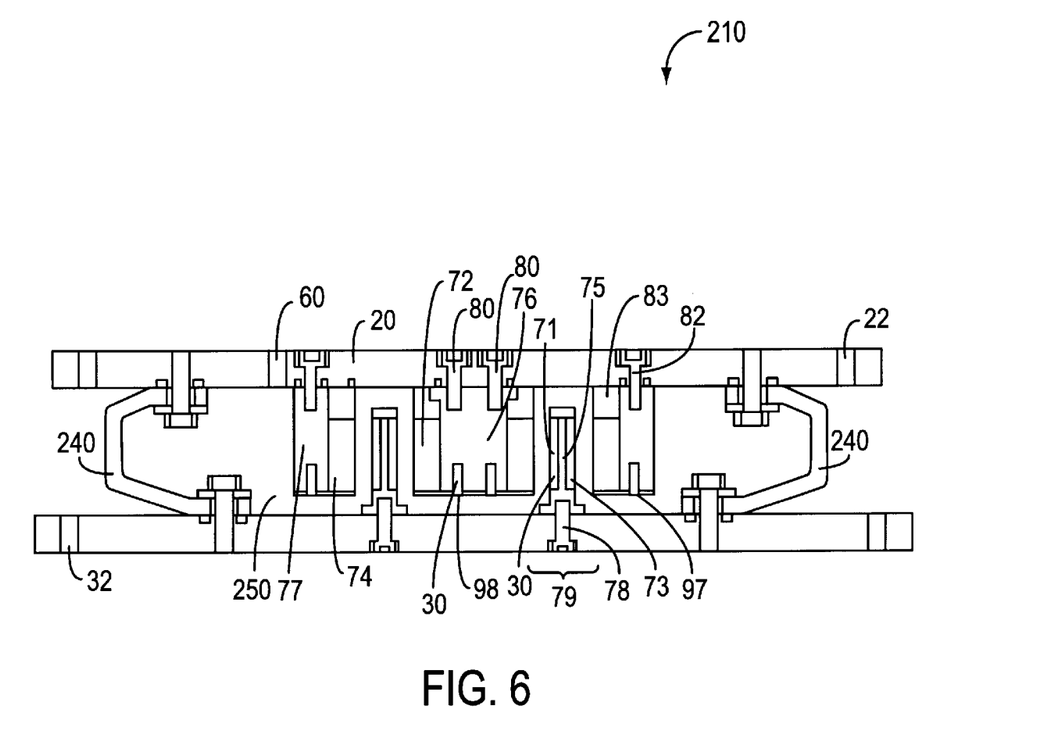
FIG. 6 is a sectional view of a third embodiment of the controllable equipment mount of the invention.

A third embodiment of a controllable mount 210 is shown in FIG. 6. This embodiment is substantially the same as the second embodiment in all material respects except that the configuration of C-mount section 240 of this embodiment is positioned such that the C-mount section 240 opens inwardly rather than outwardly. This configuration provides a chamber 250 of a greater volume than the chamber 50 which changes the characteristics of the mount 210 during transients (a temporary, mechanically induced oscillation of the load supported by the mount), as compared to the mount of FIG. 1. The mount of the third embodiment of the invention undergoes diminished travel during shock and has improved acoustical performance as compared to the mount of the second embodiment of the invention. The controllable mount of FIG. 6 has the ability of handling heavier loads, while effectively isolating them from shock loads and acoustic vibrations, than the controllable mount of the second embodiment. The controllable mount of the embodiment of FIG. 6 also includes all of the components of the EAU of the second embodiment (shown in FIGS. 3–5). Such components are illustrated in FIG. 6 and are numbered with the same numerals as in FIGS. 3–5. The operation of the mount of FIG. 6 will be apparent to those skilled in the art from the above description of the operation of the controllable mount of FIGS. 3–5.

Figure 7:
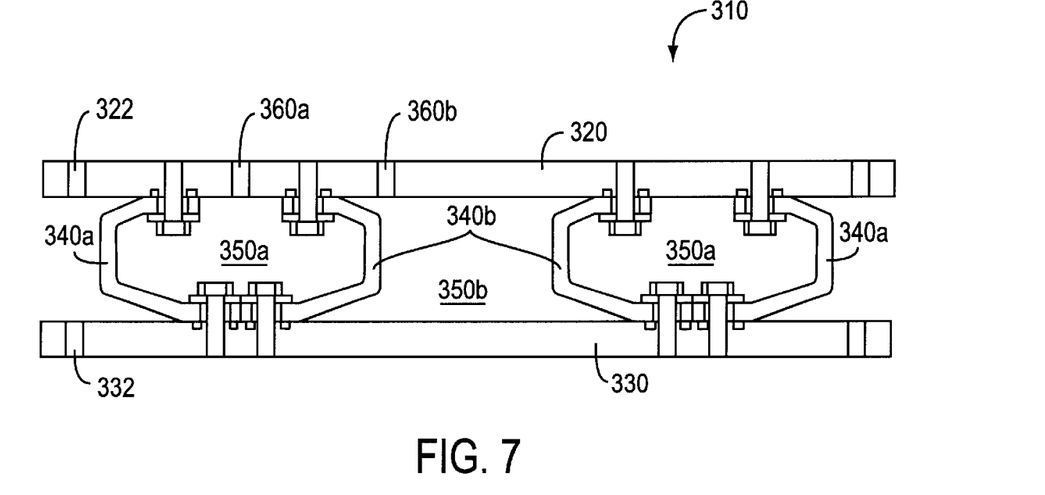
FIG. 7 is a sectional view of a fourth embodiment of the controllable equipment mount of the invention.

FIG. 7 shows a fourth embodiment of a controllable mount 310 of the invention. The mount 310 includes two C-mount sections, 340a and 340b, oriented oppositely to one another. The use of two C-mount sections creates two closed chambers including an inner chamber 350a and an outer chamber 350b. In a preferred embodiment, both closed chambers are provided with gas passageways 360a and 360b. This allows adjustment of pressure in each closed chamber independently of the other chamber. Alternatively, only one of the two chambers, 350a or 350b, may be provided with a gas passageway. If the inner and outer chambers 350a and 350b are connected together and have the same pressure, the inner C-mount section 340b will have zero differential pressure, thereby causing it to respond as a normal C-mount section.

Figure 8:
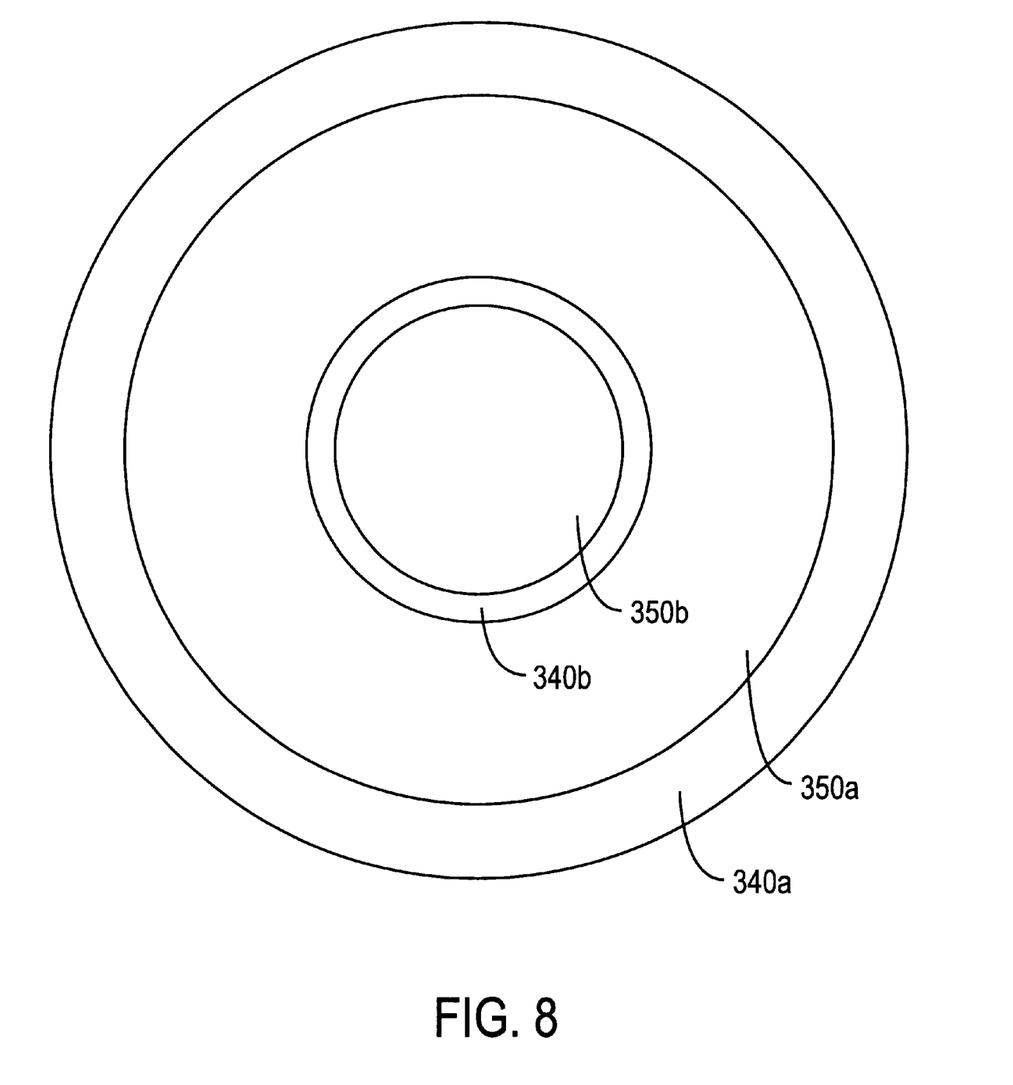
FIG. 8 is a top view of the fourth embodiment shown in FIG. 7.

FIG. 8 is a top view of the controllable mount 310 showing schematically the two chambers 350a and 350b. An outer closed chamber 350a is created between the outer C-mount section 340a and the inner C-mount section 340b. An inner closed chamber 350b is created within the inner C-mount section 340b.

Figure 9:
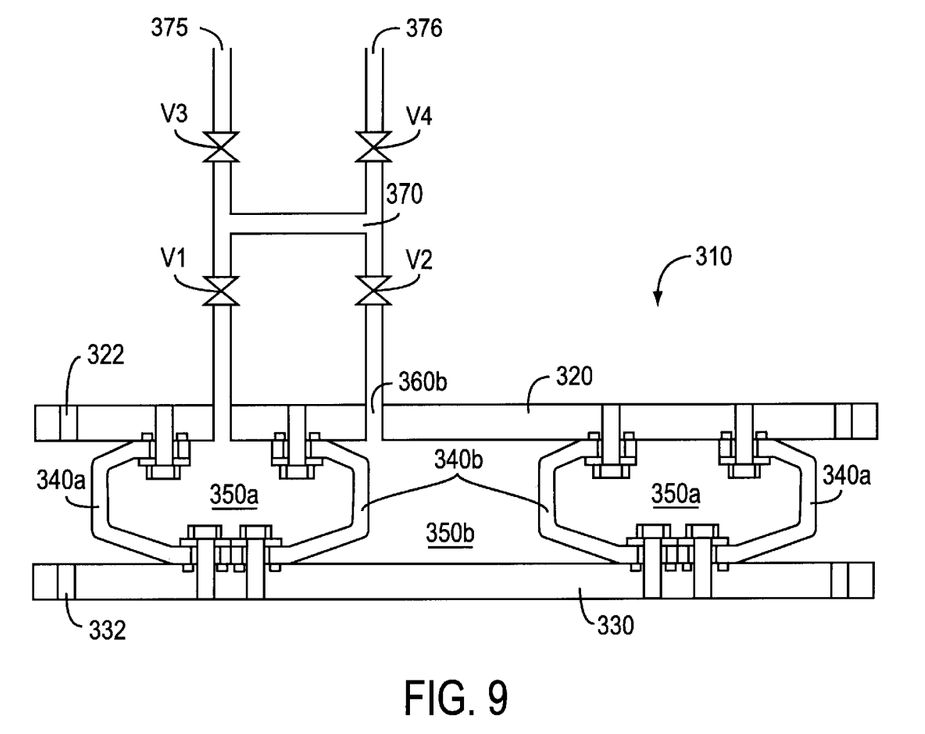
FIG. 9 is a sectional view of an alternative embodiment of the invention.

FIG. 9 shows an additional alternative embodiment of the invention. The two chambers 350a and 350b of FIG. 9 can be connected to a header 370 which allows either of the two chambers 350a and 350b to be pressurized together or separately with a pressure source 375 and a vent 376, or connected together to maintain equal pressure in both chambers. The header 370 is connected to the chamber 350a through a valve V1 and to the chamber 350b through a valve V2. The header 370 is also connected to the source of pressurized gas 375 through a valve V3 and to the vent 376 through a valve V4.

Figure 10:
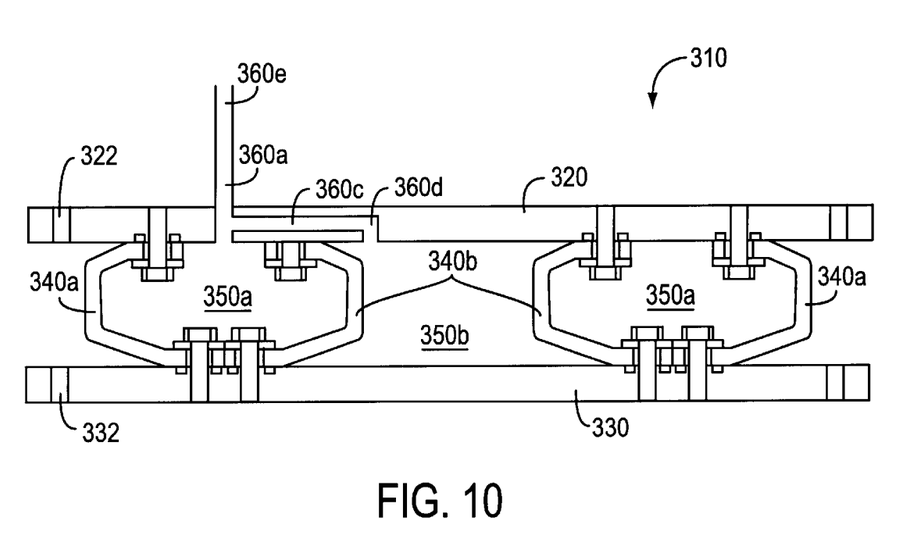
FIG. 10 is a sectional view of another alternative embodiment of the invention.

An additional alternative embodiment of the invention is shown in FIG. 10. In this embodiment, a single connection is used to connect both chambers to the pressure source 375, vent 376, to an inlet pipe 360e, or to each other. The pressure source 375 is not shown in FIG. 10, but may be connected in any suitable manner. An inner chamber inlet 360d is drilled approximately halfway through the load plate 320 from the bottom and it communicates with an outer chamber inlet 360a via a horizontal passage 360c. The outer chamber inlet 360a communicates with an inlet pipe 360e. Controlling the pressure in both chambers enables control of the mount performance. A C-mount section without pressure on the side wall attenuates different frequencies than a C-mount section with pressure on the side wall. Having one C-mount section under pressure and another with zero differential pressure across it allows the range of loads supported by the mount to be extended. Varying the pressure between the inner and outer chambers 350a and 350b allows tuning the mount to a multitude of mount requirements. The remaining elements for the embodiments shown in FIGS. 7 and 9 are designated with the same numerals as in FIG. 1, but are preceded by a prefix 300.

Modifications of the embodiments described above are contemplated. For example, in all embodiments described herein, base plate and load plate are circular. It is possible to use base and load plates of a different shape, such as polygonal, e.g., square, rectangular, triangular, pentagonal, hexagonal, or octagonal. Also, the load plate may be offset from a plane parallel or substantially parallel to the base plate, at a slight angle, e.g., at about 5 to about 20°. In any embodiments of the invention, the C-mount section should be sealed to the load plate and base plate to form at least one closed chamber, in which pressure can be varied and which may optionally include an electromagnetic augmentation unit. The C-mount section can be sealed in any suitable manner, e.g., by using O-rings and fasteners.

In any embodiments of the invention a passageway used to introduce a gas into the chamber may be placed in a location different than in the load plate illustrated in the embodiments detailed above, e.g., in the base plate or in the C-mount section. Of course, in all embodiments, the passageway is sealed by any conventional manner, e.g., by a valve, once a sufficient pressure is achieved in the chamber.

It will be apparent to those skilled in the art that other various modifications and variations can be made in the system and method of the present invention without departing from the spirit and scope of the invention. Thus, it is intended that the present invention cover the modifications and variations of this invention provided that they come within the scope of the appended claims and their equivalents.

What is claimed is:

1. A controllable equipment mount comprising:
   a base for securing the controllable equipment mount to a foundation;
   a load plate positioned substantially parallel to the base, the load plate adapted for mounting equipment;
   a C-mount section for connecting the load plate and the base, the C-mount section secured to both the load plate and the base, the C-mount section defining a closed chamber between the base and the load plate;
   at least one fastener for attaching the C-mount section to the load plate, said at least one fastener extending through a mounting hole in the C-mount section and into the load plate;
   at least one fastener for attaching the C-mount section to the base, said at least one fastener extending through a mounting hole in the C-mount section and into the base; and
   a passageway for providing communication between the chamber and an area outside the chamber.

2. The controllable equipment mount of claim 1, further comprising an electromagnetic augmentation unit positioned between the base and the load plate.

3. The controllable equipment mount of claim 1, wherein the C-mount section includes upper seals adjacent the load plate and lower seals adjacent the base.

4. The controllable equipment mount of claim 1, wherein the base comprises mounting holes for mounting it to a foundation and the load plate comprises mounting holes for securing a load.

5. The controllable equipment mount of claim 1, wherein the chamber and the C-mount section are cylindrical.

6. The controllable equipment mount of claim 1, wherein:
   the at least one fastener for attaching the C-mount section to the load plate is a plurality of fasteners each extending through a mounting hole in the C-mount section and into the load plate; and
   the at least one fastener for attaching the C-mount section to the base is a plurality of fasteners, each extending through a mounting hole in the C-mount section and into the base.

7. A controllable equipment mount comprising:
   a base for securing the controllable equipment mount to a foundation;
   a load plate positioned substantially parallel to the base, the load plate adapted for mounting equipment;
   a C-mount section for connecting the load plate and the base, the C-mount section secured to both the load plate and the base, the C-mount section defining a closed chamber between the base and the load plate;
   an electromagnetic augmentation unit positioned between the base and the load plate that includes a first portion and a second portion, the first portion of the electromagnetic augmentation unit connected to the base, and the second portion of the electromagnetic augmentation unit connected to the load plate, the electromagnetic augmentation unit controlling spacing between the base and the load plate; and
   a passageway for providing communication between the chamber and an area outside the chamber.

8. The controllable equipment mount of claim 7, wherein:
   the first portion of the electromagnetic augmentation unit connected to the base includes a coil assembly; and
   the second portion of the electromagnetic augmentation unit connected to the load plate includes an outer magnet assembly and an inner magnet assembly.

9. A controllable equipment mount comprising:
   a base for securing the controllable equipment mount to a foundation;
   a load plate positioned substantially parallel to the base, the load plate adapted for mounting equipment;
   a C-mount section for connecting the load plate and the base, the C-mount section secured to both the load plate and the base, the C-mount section defining a closed chamber between the base and the load plate;
   a passageway for providing communication between the chamber and an area outside the chamber; and
   an electromagnetic augmentation unit positioned between the base and the load plate, the electromagnetic augmentation unit comprising an outer magnet assembly, an inner magnet assembly, and a coil assembly within the chamber.

10. The controllable equipment mount of claim 9, wherein the outer magnet assembly comprises an outer backiron, an outer magnet adjacent the outer backiron, an outer magnet spacer separating the outer magnet from the load plate, and an outer backiron retainer plate and fasteners for securing the outer backiron to the load plate.

11. The controllable equipment mount of claim 9, wherein the inner magnet assembly comprises an inner backiron, an inner magnet, and an inner magnet spacer separating the inner magnet from the load plate, and an inner backiron retainer plate for securing the inner backiron to the load plate.

12. The controllable equipment mount of claim 9, wherein the coil assembly comprises a coil backiron, an inner coil, an outer coil and a coil assembly fastener for attaching the coil assembly to the base.

13. A controllable equipment mount comprising:
   a base for securing the mount to a foundation;
   a load plate positioned substantially parallel to the base, the load plate adapted for mounting equipment;
   a C-mount section for connecting the load plate and the base, the C-mount section being secured to both the load plate and the base, the C-mount section defining a closed chamber between the base and the load plate;
   at least one fastener for attaching the C-mount section to the load plate, said at least one fastener extending through a mounting hole in the C-mount section and into the load plate;
   at least one fastener for attaching the C-mount section to the base, said at least one fastener extending through a mounting hole in the C-mount section and into the base; and
   means for adjusting the stiffness of the controllable equipment mount.

14. The controllable equipment mount of claim 13, wherein the means for adjusting the stiffness of the controllable equipment mount includes a means for adjusting internal pressure of the chamber which comprises a passageway for allowing gas to escape and be introduced into the chamber.

15. The controllable equipment mount of claim 13, wherein the means for adjusting the stiffness comprises an electromagnetic augmentation unit.

16. The controllable equipment mount of claim 14, which comprises a second means for adjusting the stiffness which includes an electromagnetic augmentation unit.

17. A controllable equipment mount comprising:
   a base for securing the controllable equipment mount to a foundation;
   a load plate positioned substantially parallel to the base, the load plate adapted for mounting equipment;
   a first C-mount section for connecting the load plate and the base, the first C-mount section being secured to both the load plate and the base, the first C-mount section defining a first closed chamber between the base and the load plate;
   a second C-mount section within the first C-mount section, the second C-mount section being secured to both the load plate and the base, the second C-mount section defining a second closed chamber between the base and the load plate, the second closed chamber defining an inner chamber within the first closed chamber; and
   pressure adjustment means for adjusting an internal pressure of at least one of said first and second chambers.

18. The controllable equipment mount of claim 17, wherein the pressure adjustment means comprises an air passageway.

19. The controllable equipment mount of claim 17, wherein both said first and second chambers comprise a pressure adjustment means.

20. A controllable equipment mount comprising:
   a base for securing the controllable equipment mount to a foundation;
   a load plate positioned substantially parallel to the base, the load plate adapted for mounting equipment;
   a C-mount section for connecting the load plate and the base, the C-mount section secured to both the load plate and the base, the C-mount section defining a closed chamber between the base and the load plate;
   a passageway for providing communication between the chamber and an area outside the chamber; and
   an additional C-mount section positioned in the chamber and defining an inner chamber within the chamber.

21. The controllable equipment mount of claim 20, wherein the additional C-mount section is oriented oppositely to the C-mount section.

22. The controllable equipment mount of claim 20, further comprising a passageway in the inner chamber for providing communication between the inner chamber and an area outside the inner chamber.

* * * * *